(12) United States Patent
Becker et al.

(10) Patent No.: US 6,488,134 B2
(45) Date of Patent: Dec. 3, 2002

(54) STEP-BY-STEP RATCHET MECHANISM WITH A SILENT RATCHET

(75) Inventors: Burckhard Becker, Solingen (DE); Robert Houston, Leichlingen (DE)

(73) Assignee: C. Rob. Hammerstein GmbH & Co.KG (DE)

( * ) Notice: Subject to any disclaimer, the term of this patent is extended or adjusted under 35 U.S.C. 154(b) by 13 days.

(21) Appl. No.: 09/849,921

(22) Filed: May 4, 2001

(65) Prior Publication Data

US 2001/0037925 A1 Nov. 8, 2001

(30) Foreign Application Priority Data

May 5, 2000 (DE) .......................... 100 21 846

(51) Int. Cl.[7] .............................. F16D 67/02; B60N 2/44
(52) U.S. Cl. .............................. 192/19; 74/143; 74/157; 74/158; 192/43.1; 297/367
(58) Field of Search ............................... 192/223.2, 19, 192/15, 43.1; 74/143, 157, 158, 535; 297/367, 361.1

(56) References Cited

U.S. PATENT DOCUMENTS 4,805,481 A * 2/1989 Bauer et al. ................. 74/143
5,881,854 A * 3/1999 Rougnon-Glasson ........ 192/15
6,178,838 B1 * 1/2001 Schwarzbich ............. 192/43.1
6,230,867 B1 * 5/2001 Schwarzbich ............... 192/15
6,253,894 B1 * 7/2001 Schumann et al. .......... 192/15
6,296,311 B1 * 10/2001 Bonk et al. ................. 297/367

FOREIGN PATENT DOCUMENTS

DE    40 08 438 A1 * 5/1991
DE    44 00 910    7/1995
WO    WO99/41101    8/1999

* cited by examiner

Primary Examiner—Rodney H. Bonck
(74) Attorney, Agent, or Firm—Akerman Senterfitt

(57) ABSTRACT

A step-by-step ratchet mechanism has a mount, a hand lever carried on the mount and pivotable about an axis, and a ratchet provided with a toothed set wheel and with an output shaft rotatable about an axis of the ratchet in the mount. Two catches are provided, which a) are each hinged on the hand lever and are pivotal around an axis of the catch, b) are each provided with a toothed quadrant with several teeth that cooperates with the set wheel, c) have a supporting flank that neighbors an abutment of the mount and d) are provided with a spring pretensioning the two supporting flanks towards the abutment. Two mean position levers are carried on the mount and are each pivotal about an axis of the mean position levers, one mean position lever being assigned to each catch. The mean position levers have a stop flank.

15 Claims, 4 Drawing Sheets

STEP-BY-STEP RATCHET MECHANISM WITH A SILENT RATCHET

BACKGROUND OF THE INVENTION

1. Field of the Invention

The invention relates to a step-by-step ratchet mechanism with a mount, with a hand lever that is carried on the mount in such a manner that it is pivotal about an axis of the hand lever, with a ratchet that is provided with a toothed set wheel and with an output shaft that is rotatable about an axis of the ratchet in the mount, with a pair of catches that a) are each hinged on the hand lever so as to be pivotal about an axis of the catch, b) are provided with a gear cutting that matches the set wheel and cooperates with it, c) are provided with a supporting flank that neighbors an abutment of the mount and d) are provided with a first elastic means that resiliently pretensions the two supporting flanks adjacent the abutment.

2. Description of the Prior Art

In practice, this step-by-step ratchet mechanism, which has been proposed by DE 44 00 910 A1, on principle proved its worth. Each gear cutting has only one unique tooth that is not in engagement with the faces of the set wheel's teeth when the hand lever is in its neutral position. On pivoting the hand lever, one of the two teeth contacts one of the faces of the set wheel's teeth and causes said wheel to rotate. The ratchet provided is a silent ratchet, more specifically a grip roller freewheel, and reference is made in this connection by way of example to WO 9941101.

In this step-by-step ratchet mechanism of the art the hand lever normally is in its neutral position in which it is kept by elastic means. By pushing the hand lever in one direction of rotation, the ratchet is unlocked and the output shaft is rotated in one direction. By repeatedly pushing the hand lever in the same direction of rotation, the adjustment procedure is carried on. By pivoting the hand lever in the other direction, in most cases by pulling the hand lever upward, adjustment of the output shaft is achieved in the other direction of rotation. The step-by-step ratchet mechanism is more specifically intended to be used in devices for adjusting vehicle seats.

In the step-by-step ratchet mechanism of the prior art the maximum angle of rotation of the set wheel that may be achieved in one travel of the hand lever is limited by the fact that only one tooth of the gear cooperates with only one gear of the set wheel at a time, and that, after a certain angle of rotation, it is removed from engagement. On return of motion of the regulating forces on the hand lever the behavior needs improvement as well.

This is where the invention comes to bear. In view of the step-by-step ratchet mechanism of the type mentioned above, it is an object of the present invention to provide improvement thereof in such a manner that the set wheel may be rotated up to a maximum rotation depending on the traveling angle of the hand lever at any travel thereof, the angle of rotation of this maximum rotation being greater than what can be achieved with the step-by-step ratchet mechanism of the prior art.

SUMMARY OF THE INVENTION

In view of the step-by-step ratchet mechanism of the type mentioned above, the solution of this object is to further provide each catch with e) a pin, to have the gear cutting designed as a toothed quadrant with several teeth, to have two mean position levers carried on the mount in such a way that they are each pivotal about an axis of the mean position levers, one mean position lever being assigned to each catch, to have the mean position levers provided with a stop flank, a stop area of the mount being assigned and adjacent to each of said stop flanks, to have a second elastic means allocated to the two mean position levers, said elastic means resiliently pretensioning the stop flank against each stop area, and to have the mean position levers provided each with a guide bight designed for receiving and guiding the pin of the corresponding catch and arranged in such a manner that its aperture faces the aperture of the other guide bight.

Both catches have several teeth arranged on a toothed quadrant, engagement between the set wheel and the hand lever with catch that can be considered part of a gear being possible within a greater pivoting angle than with the prior art mechanisms as a result thereof. The catches are controlled by the mean position levers by way of their pins. For this purpose, the mean position levers have one guide bight each, into which the pin of that toothed quadrant that is not in the drive path for the moment is moved into mesh. On returning the hand lever to the neutral position, the corresponding catch is moved in such a controlled way via the guide bight that its teeth are capable of meshing with the gear cutting of the set wheel. While the catches are hinged on the hand lever, the mean position levers are hinged on the mount.

The mean position levers each have a stop flank that is supported by a stop area of the mount in neutral position of the hand lever. The second elastic means, which is preferably designed as a tension spring, causes the two mean position levers to be pulled toward each other onto the corresponding stop area. Said stop area is preferably formed by a rib of the mount. Since the mean position levers directly act on the corresponding catches via their guide bights and the pins, the second elastic means too has a direct effect on the catches. It causes the two toothed quadrants to be elastically biased toward each other, thus competing with the first elastic means that elastically urges the two toothed quadrants away from each other. Now the geometry is adjusted in such a manner that the mean position levers abut the corresponding stop area with their stop flank when the two toothed quadrants of the catches mesh with the teeth on the set wheel. This means that the second elastic means indirectly secures the neutral position of the hand lever by way of the catches.

In a preferred embodiment, the step-by-step ratchet mechanism is substantially arranged mirror-inverted about a plane. The mirror plane is a plane running through the axis of the hand lever and the axis of the ratchet. As a result thereof, the mechanical movements are executed in a similar way in the two directions of drive.

In a preferred embodiment, the catches are provided with a bearing clearance about their axes. The two elastic means resiliently pretension the catches toward each other in such a way that, despite the bearing clearance, no clatter occurs.

If however one catch has to take over the drive, the bearing clearance is first used up prior to the drive taking place, i.e., before a torque is delivered to the set wheel by way of the catch. Among others, a forward movement is thus achieved that constitutes the first path section of the working stroke, the active actuation following only thereafter.

Accordingly, in a preferred embodiment, the axis of the catch and the area of meshing of at least one of its teeth both lie on one line that substantially runs across the faces of said tooth. The driving forces thereby do not cause the teeth of the toothed quadrant to lift off the teeth of the set wheel, but on the contrary they effect a positive engagement of the teeth of the toothed quadrant with the set wheel.

In the preferred embodiment, the pins are substantially located in the center between the axis of the catch and the area of meshing of at least one tooth of an engaged toothed quadrant. The pins are preferably positioned in such a way that they are slightly displaced toward the axis of the hand lever than toward the axes of the mean position levers.

The two catches are preferably supported by having their supporting flanks resting on an axle stub of the hand lever axis in a way analogous to the one used in the indicated, most nearly connected prior art. A silencing means, more specifically a rubber coat, is preferably provided in the supporting area. On the return motion of the hand lever after a drive, this return motion being actuated by the second elastic means, the still engaged toothed quadrant that was utilized for the previously performed drive is capable of riding over the teeth of the set wheel as a result thereof, in that the corresponding catch oscillates about its catch axis without any mechanical noise being heard when the supporting flank strikes the abutment.

In a preferred embodiment the two catches are arranged on one side of a plate-shaped mount and the mean position levers are positioned on the other side of said mount. Passages are provided for the pins in the mount, said passages surrounding the pins with a clearance. This embodiment makes simple construction possible, the catches and the mean position levers remain in immediate proximity to the mount. As a result thereof, a second bearing plate of the mount is not needed and the mean position levers and the pins can be carried on one side in the plate-shaped mount.

In a preferred embodiment, the two toothed quadrants mesh with the set wheel when the hand lever is in its neutral position. The effect thereof is that the motion of the set wheel is mechanically locked.

It has to be noticed that the cooperation between the catches and the mean position levers may also be performed in a way which is different from the described one, it may more specifically be performed in kinematic reversal. The pins may thus be provided on the mean position levers while the reception bight is formed on each catch.

BRIEF DESCRIPTION OF THE DRAWINGS

Further advantages and characteristics of the invention will become apparent in the remaining claims and in the following description of an exemplary embodiment of the invention that is not limiting the scope of the present invention and that will be explained hereinafter in more detail with reference to the drawing.

DESCRIPTION OF THE PREFERRED EMBODIMENT

Figure 1:
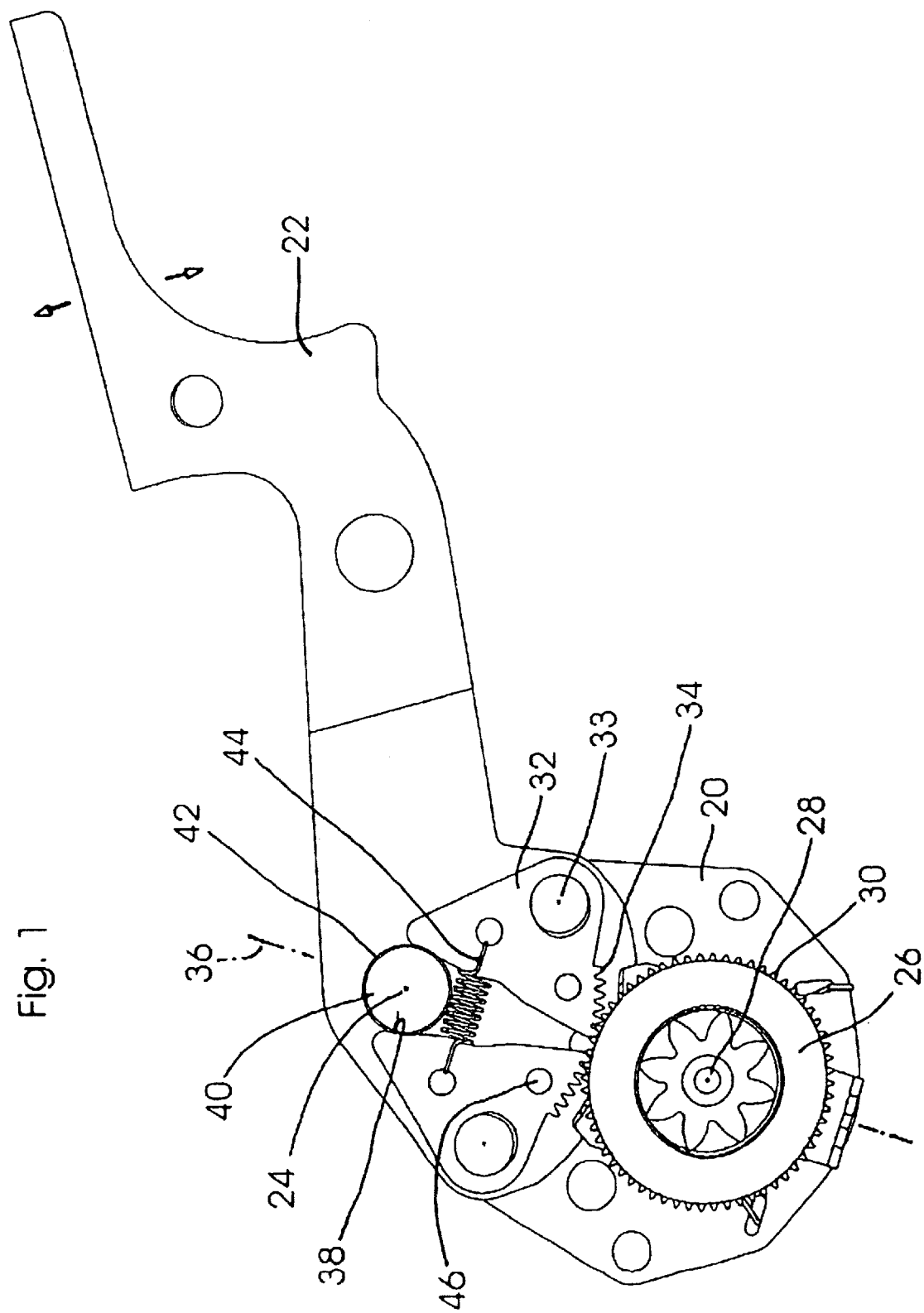
FIG. 1 is a top view of the step-by-step ratchet mechanism.

As shown in the Figures, the step-by-step mechanism has a plate-shaped mount 20. A hand lever 22 is carried on said mount in such a manner that it is pivotal about a hand lever axis 24. Starting from the respective neutral position shown in the figures, it may be pivoted in the two directions indicated by the double-headed arrow.

A ratchet 26 that is here designed as a roller silent ratchet is furthermore arranged on the mount 20. It has an output shaft that is rotatable about a ratchet axis 20 and moreover a set wheel 30.

Two catches 32 are hinged on the hand lever 22 in such a manner that they are pivotal about an axis 33 of the catches. They have a gear cutting that matches and cooperates with the set wheel 30 and that is shaped like a toothed quadrant 34 having, in the embodiment shown, six teeth. Out of these six teeth, the always innermost tooth that is nearest a plane of symmetry 36 meshes with the teeth of the set wheel 30. The plane of symmetry 36 is defined by the fact that it traverses the axis of the hand lever 24 and the axis of the ratchet 28.

The catches 32 moreover have a supporting flank 38 by which they abut on an abutment that is constituted by an axle stub 40 of the hand lever axis 24. The abutting position is, e.g., shown in FIG. 1. As shown in FIG. 1, a rubber O-ring 42 is thereby positioned around the axle stub 40 in a groove of the axle stub 40, the supporting flanks 38 resting thereon.

The two catches 32 which are built according to the same design principle but disposed in a mirror-inverted arrangement are biased against each other by a first elastic means 44, here designed as a tension spring, in such a manner that the supporting flanks 38 abut on the O-ring 42 of the axle stub 40.

As more specifically shown in FIG. 1, the catches 32 have a bearing clearance about their axes. FIG. 1 clearly shows crescent moon-shaped clearances.

Pins 46 on the catches 32 project across and traverse sufficiently large passages provided for in the mount. These pins will hereinafter be more fully referred to.

Figure 2:
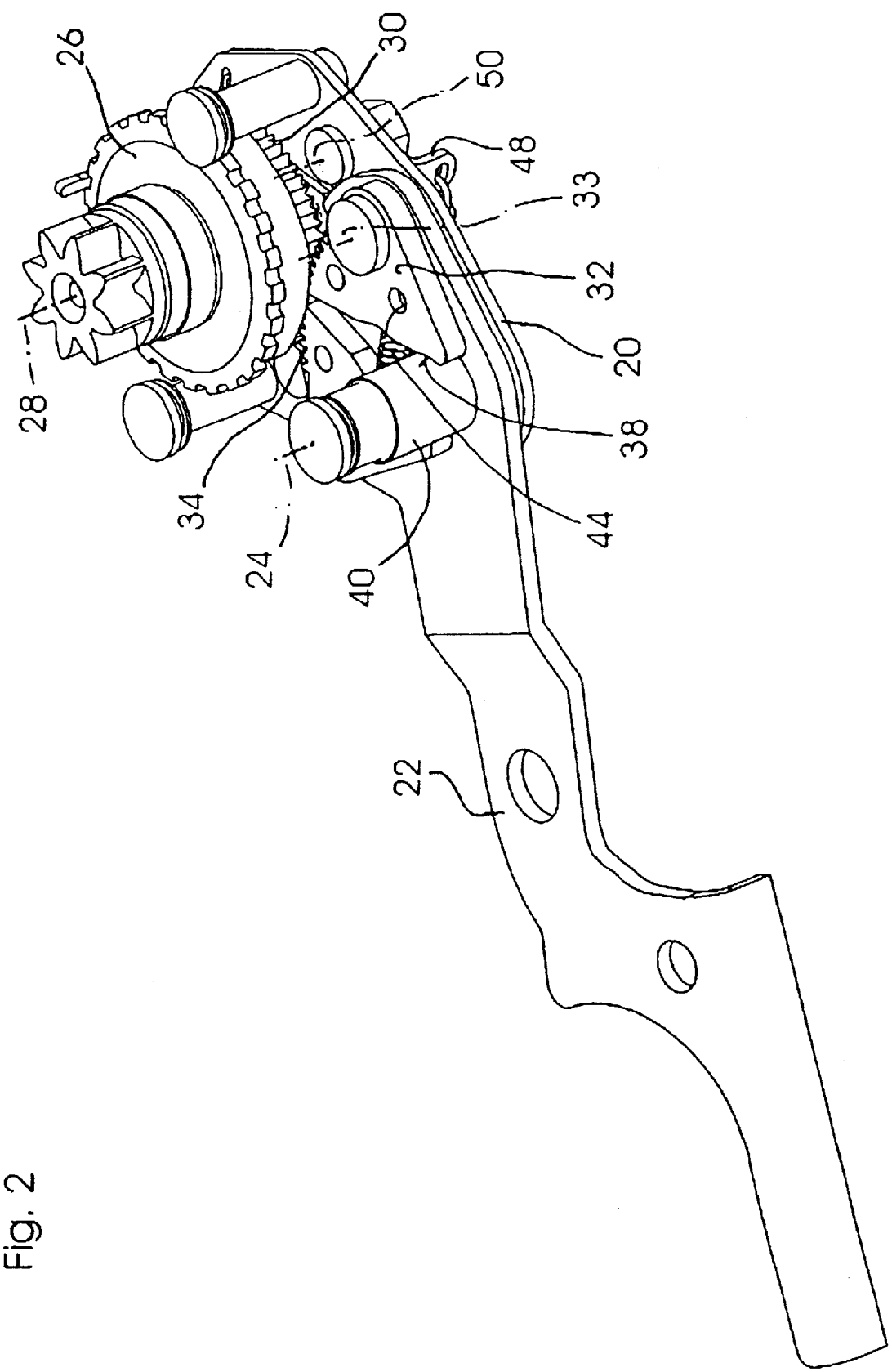
FIG. 2 is a perspective slant view of the step-by-step ratchet mechanism.
Figure 3:
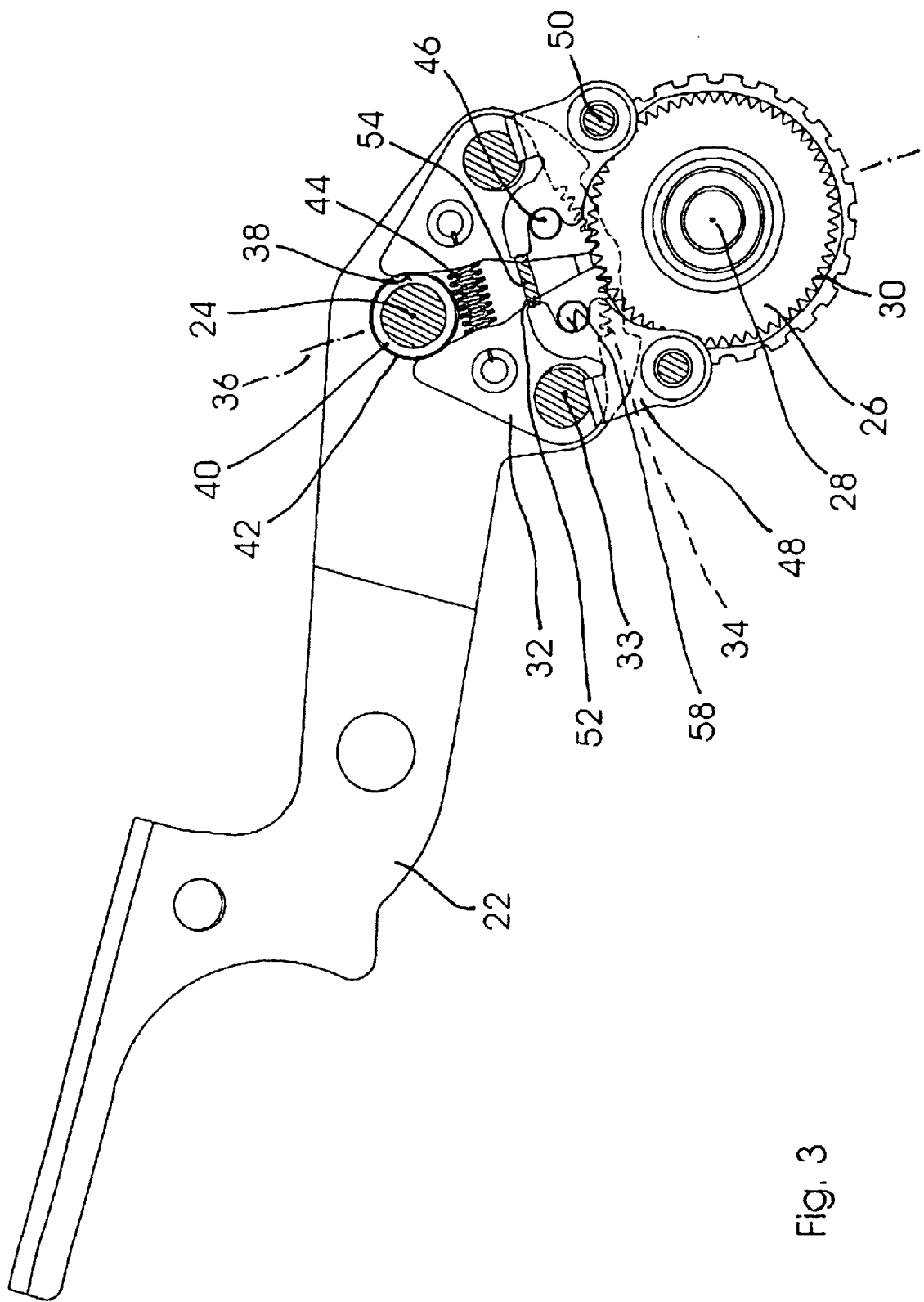
FIG. 3 is a bottom view of the step-by-step ratchet mechanism, the plate-shaped mount having been omitted

On the other side of the mount 20, two mean position levers 48 are carried on the mount 20 in a mirror-inverted arrangement in such a manner that they are pivotal about the axes 50 of the mean position levers. Each catch 32 is thereby allocated a mean position lever 48. The mean position levers 48 each have a stop flank 52 each being assigned a stop area of the mount 20. The stop areas are thereby formed by narrow areas of a rib 54 that is made of the sheet metal of the hand lever 22 and that is curved upward. The two mean position levers 48 are resiliently loaded against each other by a second elastic means 56 that is again designed as a helical tension spring in such a manner that their stop flanks 52 are abutting on the rib 54, in the manner shown by the Figures. In FIG. 3, the second elastic means 56 has not been drawn for the purpose of simplifying the representation, but it is shown in the FIGS. 2 and 4.

Each mean position lever 48 has a substantially semicircular guide bight 58 that opens toward the guide bight 58 of the other mean position lever 48, respectively. The guide bight 58 matches the pin 46 which is made of round bar material in the manner shown by FIG. 3.

The axes 50 of the mean position levers are arranged in the neighborhood of the set wheel's 30 teeth. A straight line that joins the two axes 50 of the mean position levers intersects a radial of the set wheel 30 that ends in an area of meshing of a catch's 32 tooth. The point of intersection is located nearer to the area of meshing than to the center of the set wheel 30. The relationship is approximately of 1 to 2.

As more specifically shown in FIG. 3, the action of the two elastic means 44 and 56 is opposed. Whereas the first elastic means 44 resiliently urges the toothed quadrants 34 of the two catches apart, the second elastic means 56 effects just the opposite. The function of the second elastic means 56 is however limited by the stop flanks 52 striking on the rib 54 and said second elastic means more specifically then comes into effect when the hand lever 22 is pivoted out of its neutral position.

Figure 4:
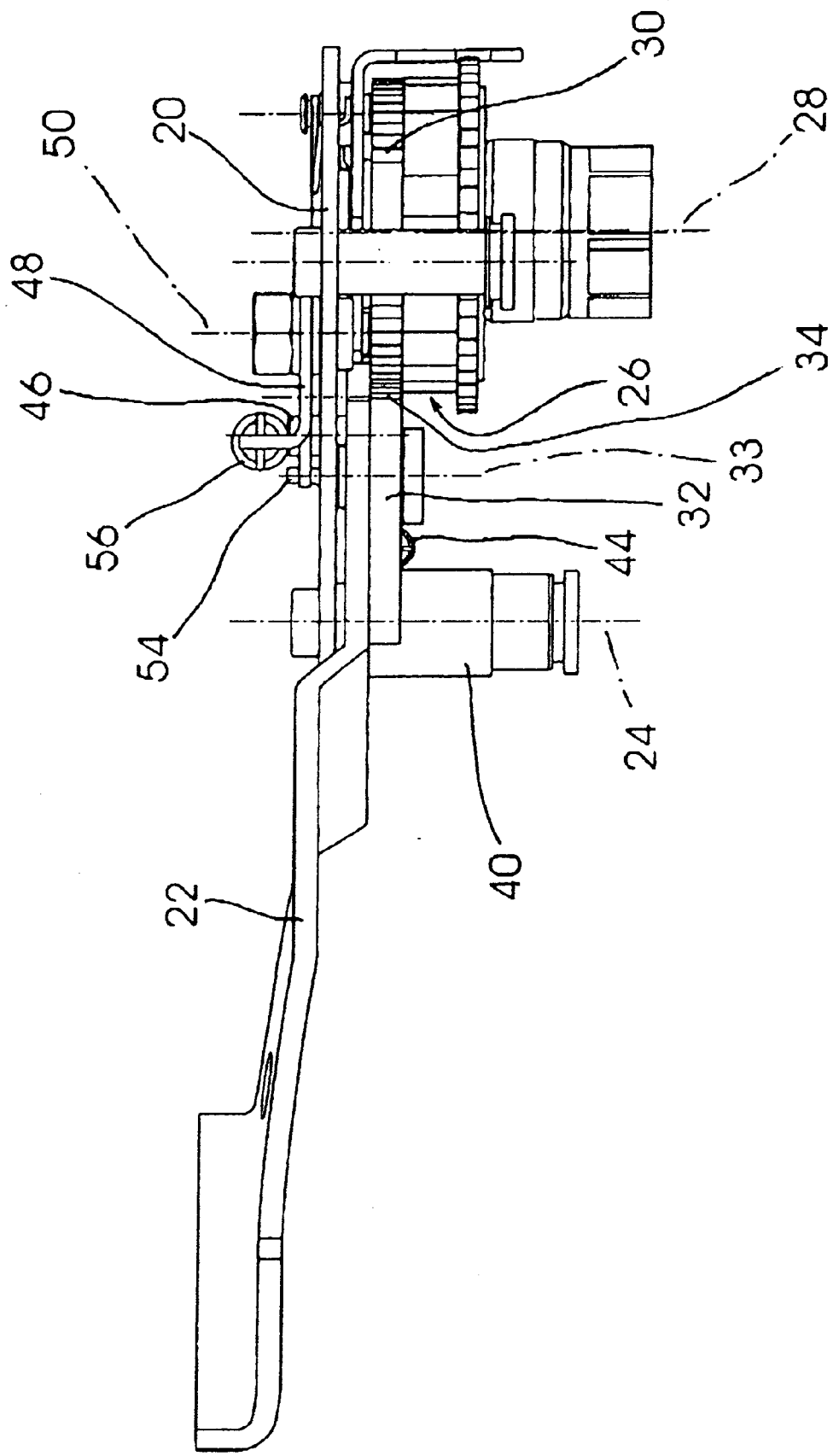
FIG. 4 is a side view of the step-by-step ratchet mechanism.

In the exemplary embodiment shown, the step-by-step ratchet mechanism is substantially assembled of flat component parts made of sheet metal stampings. As shown in FIG. 4 for example, the sequence of the layers is as follows: in FIG. 4, the two mean position levers 48 are on the top, they are arranged on the upper side of the plate-shaped mount 20 located underneath. The hand lever 22 is located directly underneath the plate-shaped mount 20. The rib 54 of the hand lever 22 projects through an aperture of the mount 20, thus being capable of cooperating with the stop flanks 52 of the two mean position levers 48. The edges of the aperture thereby simultaneously form stop areas for the rib 54, the maximum pivoting angle of the hand lever 22 being limited in the two directions of movement of the hand lever 22 as a result thereof. The two catches 32 are located adjacent and underneath the hand lever 22.

The function is now explained hereinafter: If, starting from the neutral position shown in FIG. 1, the hand lever 22 is pivoted downward, i.e., if it is rotated clockwise, the clearance in the region of the bearing of the right-handed catch is used up first. In the motion that is being considered, the left-handed catch has no efficient bearing clearance and is directly pivoted out of engagement with the teeth of the set wheel 30. As a result thereof, it no longer prevents the right catch 32 from starting the drive motion. In that the hand lever 22 continues the drive motion, the set wheel 30 is rotated counterclockwise, thus actuating the output shaft of the ratchet 26. The teeth of the toothed quadrant of the right catch 32 are thereby successively moved into mesh with the teeth of the set wheel 30.

Clockwise actuation of the hand lever 22 may be performed until it strikes on the rib 54 on the aperture of the mount 20, it may however be terminated in any position prior to said stop. Accordingly, any adjusting procedure may be performed by means of the step-by-step ratchet mechanism.

As the actuation procedure is being started, the pin 46 of the right-handed, driving catch 32 moves out of the guide bight 58 of the corresponding, right mean position lever 48. The mean position lever, which is hinged on the mount 20, is not capable of following the movement of the pin 46 since its stop area 52 already abuts the rib 54. The left mean position lever is pivoted outward instead. The left catch 32, which is pulled away upward to the left on account of its position on the hand lever 22 in FIG. 1, takes, by way of its pin 46, the left mean position lever 48 along to the outside, the pin 46 presses the left mean position lever 48 against the action of the second elastic means 56 upward to the left. The second elastic means 56 is thereby tensioned.

As soon as no force is imparted any longer on the hand lever 22, the return travel of said hand lever 22 is started. This is caused by the action of the tensioned second elastic means 56. The hand lever 22 is thereby automatically returned to the neutral position. In the process, the right catch slips with its teeth over the teeth of the set wheel 30. Since its pin 46 is outside the guide bight 58 of the right mean position lever 48, the right catch merely stands under the action of the first elastic means 44. On the return travel, it executes small nodding movements about its bearing, its supporting flank 38 repeatedly deviating from the O-ring 42 and again abutting on it.

Under the action of the second elastic means 56, the mean position levers 48 precisely abut on the rib 54 when the toothed quadrants 34 of the catches 32 are in engagement with the set wheel 30, the engagement referred to being the one shown in FIG. 1.

The direct connection between the two mean position levers 48 which is effected by one single elastic means 56 may be replaced by two discrete elastic means, one discrete means being provided for every single mean position lever 48. The same is true for the first elastic means 44. The embodiment shown saves component parts, though.

It is decisive for the step-by-step ratchet mechanism that the catch 32 that is participating in the drive is freed from the action of its mean position lever 48, thus being capable of riding over the teeth of the set wheel 30 during the return travel without being loaded by the second elastic means 56. The teeth of its toothed quadrant 34 and the corresponding teeth of the set wheel 30 are designed in such a way that gliding back over the teeth is made possible.

The second elastic means 56 applies a considerably higher and additionally reverse torque to the catches 32 than the first elastic means 44, the catches 32 always being deviated the same way. According to the invention and as described above, the catch 32 that is presently participating in the drive is freed from the action of the second elastic means 56.

Under the action of the second elastic means 56, the mean position levers 48 precisely abut on the rib 54 when their toothed quadrants 34 are in engagement with the set wheel 30, the engagement referred to being the one shown in FIG. 1.

What is claimed is:

1. Step-by-step ratchet mechanism for use in devices for adjusting vehicle seats, comprising in combination:

a mount;

a hand lever that is carried on the mount and that it is pivotal about an axis of the hand lever;

a ratchet that is provided with a toothed set wheel and with an output shaft, the output shaft being rotatable about an axis of the ratchet provided in the mount;

two catches that a) are each hinged on the hand lever and are pivotal about an axis of the catch, b) are each provided with a gear cutting which gear cutting cooperates with and matches the set wheel, c) are each provided with a supporting flank which supporting flank is arranged in the vicinity of an abutment of the mount and d) are provided with a first elastic means that resiliently pretensions the two supporting flanks towards adjacent the abutment, e) each catch being provided with a pin, the gear cutting being designed as a toothed quadrant with several teeth;

two mean position levers that are carried on the mount and are pivotal each about an axis of the mean position levers, one mean position lever being assigned to each catch, the mean position levers being provided with a stop flank, the mean position levers being provided each with a guide bight which guide bight is designed for receiving and guiding the pin of the corresponding catch, has an aperture and is arranged so that its aperture faces the aperture of the other guide bight;

a stop area of the hand lever that is assigned to and is arranged adjacent to each of said stop flanks; and a second elastic means that is allocated to the two mean position levers, said second elastic means resiliently pretensioning the stop flank against each stop area.

2. Step-by-step ratchet mechanism according to claim 1, wherein the two catches and the two mean position levers are arranged mirror-inverted about a plane of symmetry going through the axis of the hand lever and the axis of the ratchet.

3. Step-by-step ratchet mechanism according to claim 1, wherein the several teeth of the toothed quadrant have faces and for each one of the two catches a line going through the axis of the catch and through the area of meshing of one of the teeth of the toothed quadrant, which tooth is engaged in the toothed quadrant, substantially runs oblique to one of the faces of said one tooth.

4. Step-by-step ratchet mechanism according to claim 1, wherein the pins are substantially located in a center between the axis of the catch and the area of meshing of at least one tooth of an engaged toothed quadrant and wherein the pins are positioned in such a manner that they are slightly displaced toward the axis of the hand lever.

5. Step-by-step ratchet mechanism according to claim 1, wherein the abutment is formed by an axle stub of the axis of the hand lever and is provided with a silencing means.

6. Step-by-step ratchet mechanism according to claim 1, wherein the two toothed quadrants are provided with at least 5 teeth each and wherein the center of the curve they describe lies on the axis of the hand lever.

7. Step-by-step ratchet mechanism according to claim 1, wherein the two catches are arranged on one side of a plate-shaped mount and the mean position levers are positioned on the other side of said mount and wherein passages are provided for the pins in the mount, said passages surrounding the pins with a clearance.

8. Step-by-step ratchet mechanism according to claim 1, wherein a plane running through the two axes of the mean position levers goes through the set wheel and is closer to the area of meshing of at least one tooth of an engaged toothed quadrant than to the axis of the ratchet.

9. Step-by-step ratchet mechanism according to claim 1, wherein the two axes of the mean position levers are located outside the set wheel and are arranged in the neighborhood of said set wheel.

10. Step-by-step ratchet mechanism according to claim 9, wherein a distance between the two axes of the mean position levers and the axis of the ratchet is 10 to 50% larger than the outer radius of the set wheel.

11. Step-by-step ratchet mechanism according to claim 10, wherein the distance approximately 25% larger.

12. Step-by-step ratchet mechanism according to claim 1, wherein, in a neutral position of the hand lever, the toothed quadrants are both meshing with the set wheel.

13. Step-by-step ratchet mechanism according to claim 1, wherein the ratchet is designed as a silent ratchet.

14. Step-by-step ratchet mechanism according to claim 1, wherein the stop area is designed as a rib.

15. Step-by-step ratchet mechanism according to claim 1, wherein the silencing means is a rubber O-ring.

* * * * *